(12) United States Patent  (10) Patent No.: US 8,820,245 B1
Quioc  (45) Date of Patent: Sep. 2, 2014

(54) GAS GENERATING SYSTEM

(75) Inventor: Eduardo L. Quioc, Westland, MI (US)

(73) Assignee: TK Holdings Inc, Armada, MI (US)

( * ) Notice: Subject to any disclaimer, the term of this patent is extended or adjusted under 35 U.S.C. 154(b) by 0 days.

(21) Appl. No.: 13/165,129

(22) Filed: Jun. 21, 2011

Related U.S. Application Data

(60) Provisional application No. 61/357,050, filed on Jun. 21, 2010.

(51) Int. Cl.
*C06D 5/00* (2006.01)

(52) U.S. Cl.
USPC .......................................................... 102/530

(58) Field of Classification Search
USPC ................ 102/530, 202.14; 55/462
See application file for complete search history.

(56) References Cited

U.S. PATENT DOCUMENTS

| | | | |
|---|---|---|---|
| 6,315,322 B1 | 11/2001 | Mika | 280/736 |
| 6,701,849 B2 * | 3/2004 | McFarland et al. | 102/530 |
| 7,438,315 B2 | 10/2008 | Blackburn | 280/741 |
| 7,597,353 B2 | 10/2009 | Smith et al. | 280/736 |
| 2007/0095035 A1 * | 5/2007 | Quioc | 55/462 |
| 2008/0156216 A1 * | 7/2008 | Yoshida et al. | 102/202.14 |
| 2009/0288574 A1 * | 11/2009 | Jackson et al. | 102/530 |
| 2010/0018431 A1 * | 1/2010 | Maeda et al. | 102/530 |

* cited by examiner

*Primary Examiner* — Michael Carone
*Assistant Examiner* — John D Cooper
(74) *Attorney, Agent, or Firm* — L.C. Begin & Associates, PLLC

(57) ABSTRACT

A gas generating system includes a housing with a first housing portion and a second housing portion configured to define a flow channel therebetween. The first housing portion includes a peripheral distension engageable with the second housing portion to form a sealed end of the flow channel.

4 Claims, 5 Drawing Sheets

US 8,820,245 B1

GAS GENERATING SYSTEM

CROSS REFERENCE TO RELATED APPLICATIONS

This application claims the benefit of provisional application Ser. No. 61/357,050 filed on Jun. 21, 2010, which is incorporated herein by reference.

BACKGROUND OF THE INVENTION

The embodiments of the present invention relate to gas generating systems used to generate gases for gas-actuatable devices incorporated into, for example, a vehicle occupant protection system.

Installation of gas-actuatable vehicle occupant protection systems as standard equipment in all new vehicles has intensified the development of smaller, lighter and less expensive restraint systems. Accordingly, since the gas generating system inflator used in a vehicle occupant protection system may be the heaviest and most expensive component of the system, there is an ongoing need for lighter, less expensive and less complex gas generating systems.

SUMMARY OF THE INVENTION

In one aspect of the embodiments of the present invention, a gas generating system is provided including a housing having a first housing portion and a second housing portion configured to define a flow channel therebetween. The first housing portion includes a peripheral distension engageable with the second housing portion to form a sealed end of the flow channel.

In another aspect of the embodiments of the present invention, a housing structure for a gas generating system is provided. The housing structure includes a first housing portion having a first wall. A first portion of the first wall is distended with respect to a second portion of the wall. A second housing portion includes a second wall and is configured to receive the first housing portion therein. The second wall and the second portion of the first wall are configured to define a fluid flow channel therebetween when the first housing portion is received within the second housing portion. The second wall and the first portion of the first wall are engageable to block the flow channel when the first housing portion is received within the second housing portion.

DETAILED DESCRIPTION

Figure 1:
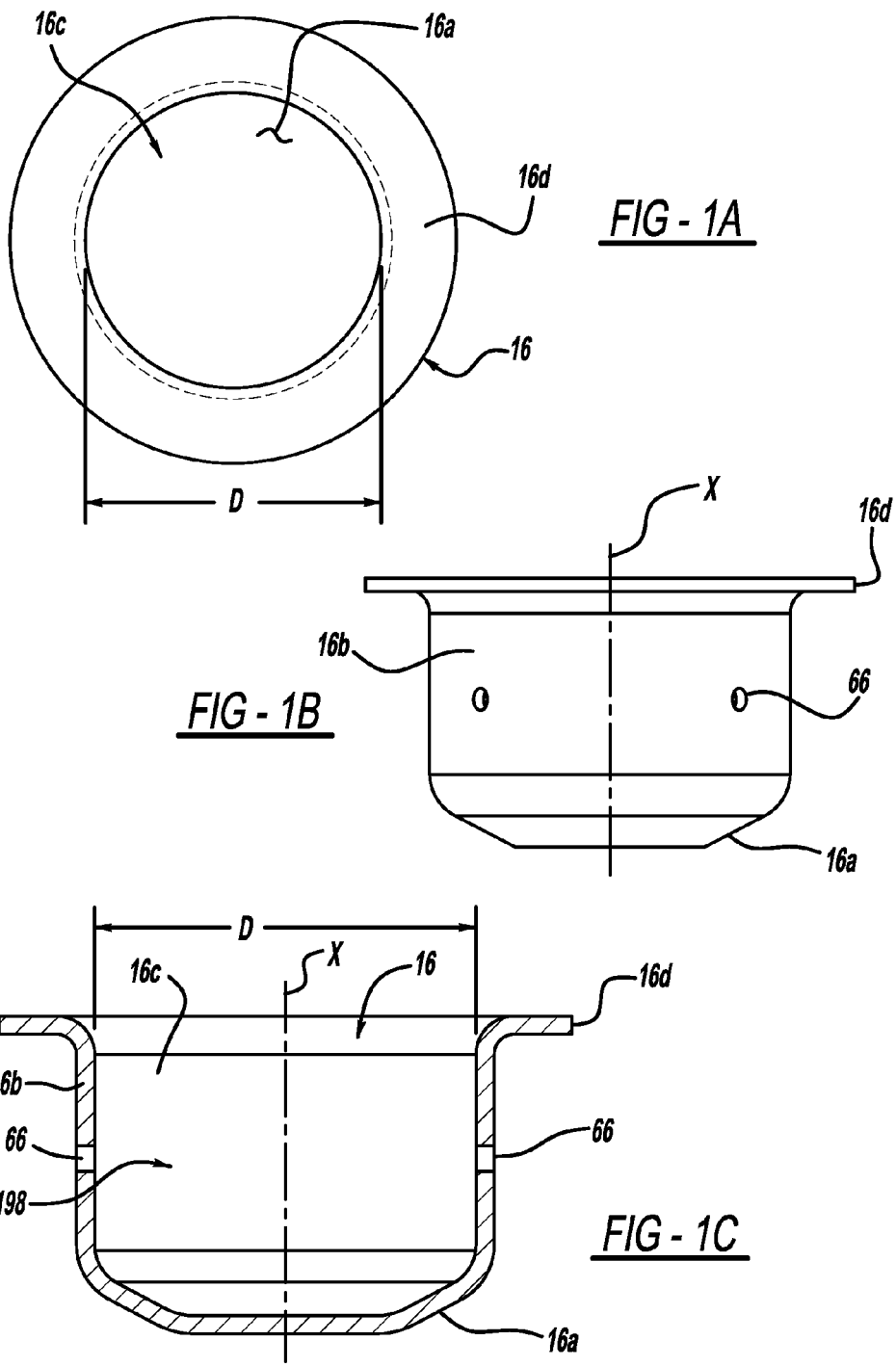
FIG. 1A is a plan view of a second housing portion of a gas generating system in accordance with an embodiment of the present invention.
FIG. 1B is a side view of the housing portion shown in FIG. 1.
FIG. 1C is a cross-sectional side view of the housing portion shown in FIG. 1.

Referring to FIGS. 1-7, a gas generating system 10 in accordance with one embodiment of the present invention includes an outer housing 12 formed from a generally cylindrical first portion 14 received within and welded or otherwise suitably attached to a generally cylindrical second portion 16.

First portion 14 includes a base portion 14a and a wall 14b extending from a perimeter of the base portion to define a chamber 14c therebetween. The base portion 14a has an opening 24 formed therein to provide access for an initiator 44 (described below) positioned within first housing portion 14. In the embodiment shown in the Figures, a first portion 14k of wall 14b proximate base 14a extends radially outwardly to a first dimension R1 while a second wall portion 14m adjacent wall portion 14k extends radially outwardly to a second dimension R2 which is less than R1. Thus, first portion 14k forms a peripheral projection or distension (i.e., housing portion 14k is distended) with respect to housing portion 14m. In addition, an outermost surface 14r of second housing portion 14m and an interior dimension D of a wall 16b of second housing portion 16 are dimensioned such that wall 16b is spaced apart from surface 14r when outer housing portions 14 and 16 are assembled to form housing 12, This enables formation of a gas flow channel 99 (see FIG. 7) between the second wall portion 14m and second portion wall 16b when the first and second housing portions 14 and 16 are assembled to form the housing 12. The size of this flow passage may be varied according to the requirements of a particular application by varying one or both of the first and second dimensions R1 and R2.

In the particular embodiment shown in FIGS. 1-7, the peripheral distension formed by housing portion 14k extends around the entire 360° circumference of the cylindrical first housing portion 14. However, if desired, the distension may extend around only a portion (or portions) of the circumference. Also, in the particular embodiment shown in FIGS. 1-7, first, distended peripheral housing portion 14k extends generally axially parallel to a first portion X1 of an axis X extending through the first housing portion 14, and the second housing portion 14m extends generally axially parallel to a second portion X2 of axis X separate from and adjacent to axis portion X1.

Figure 2:
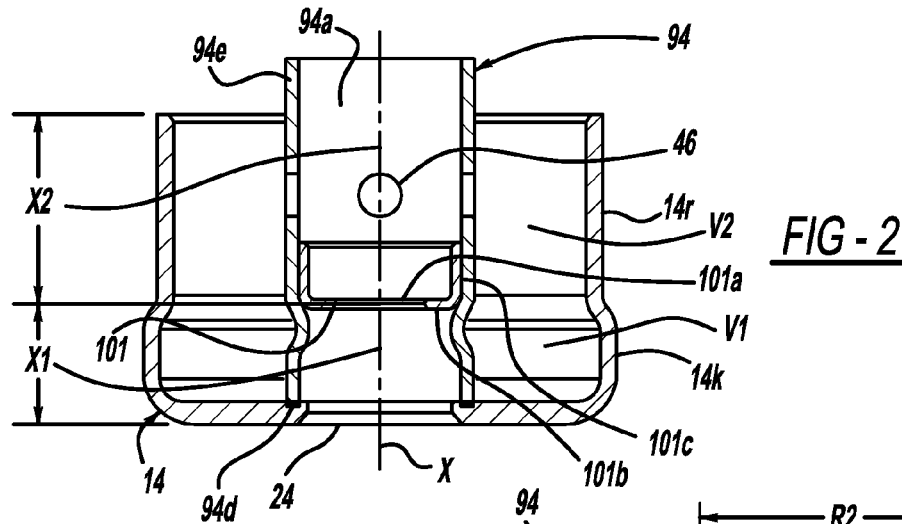
FIG. 2 is a cross-sectional side view of a portion of a gas generating system in accordance with an embodiment of the present invention.
Figure 3:
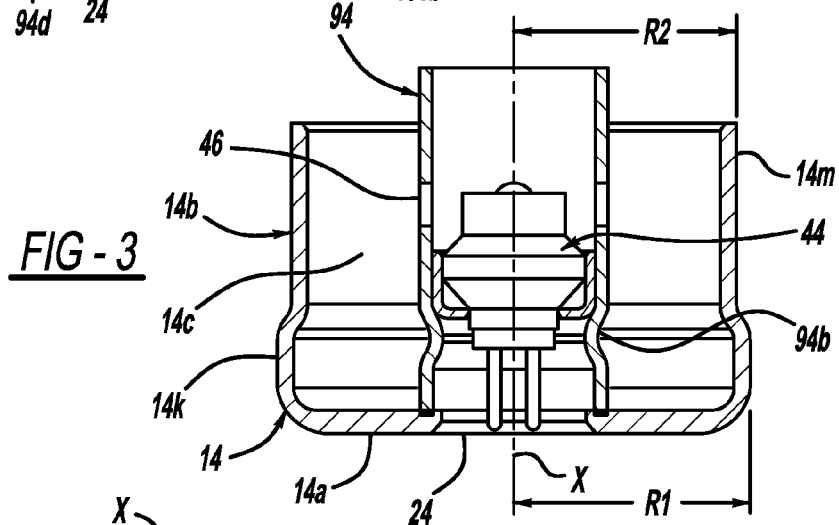
FIG. 3 is the cross-sectional side view of FIG. 2 showing an initiator mounted in the gas generating system.
Figure 4:
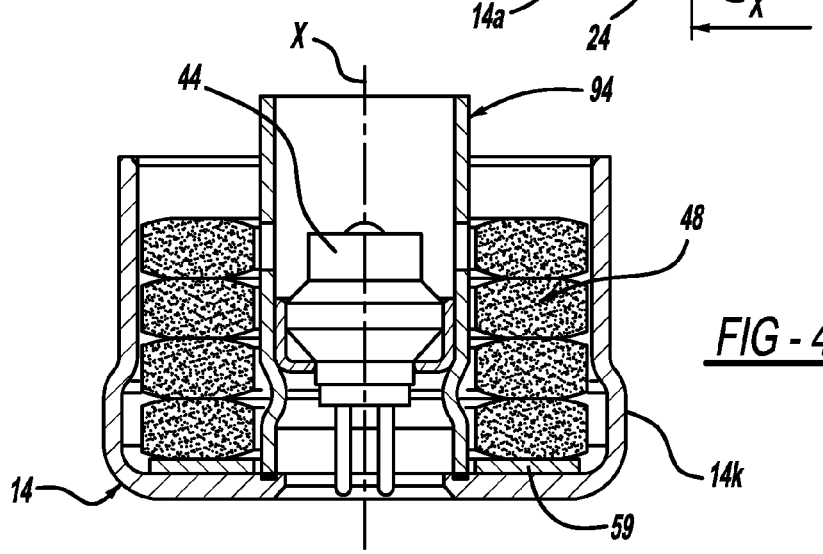
FIG. 4 is the cross-sectional side view of FIG. 3 showing a gas generant material incorporated into the gas generating system.
Figure 5:
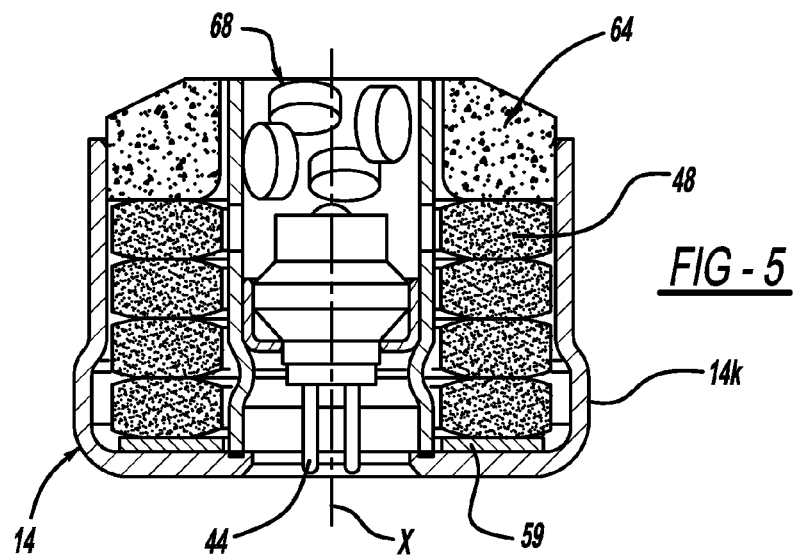
FIG. 5 is the cross-sectional side view of FIG. 4 showing a filter incorporated into the gas generating system.
Figure 6:
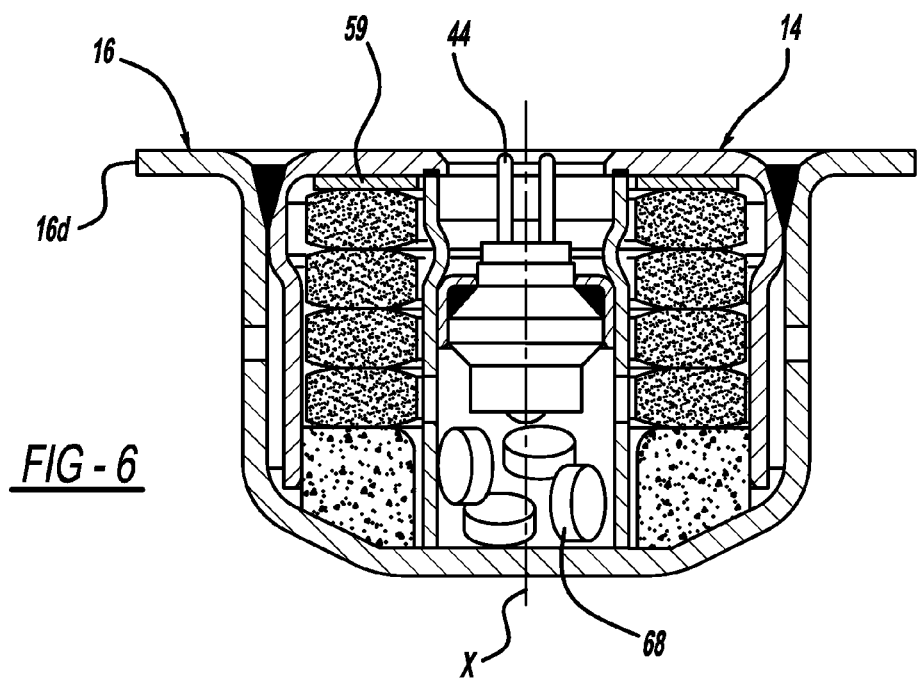
FIG. 6 is the cross-sectional side view of FIG. 5 showing a first housing portion coupled to the second housing portion to enclose the other elements of the gas generating system within the housing.

From FIG. 2 it may be seen that first housing portion 14k defines a portion V1 of the internal volume of housing portion 14, while second housing portion 14m defines a portion V2 of the housing portion internal volume adjacent volume portion V1.

Figure 7:
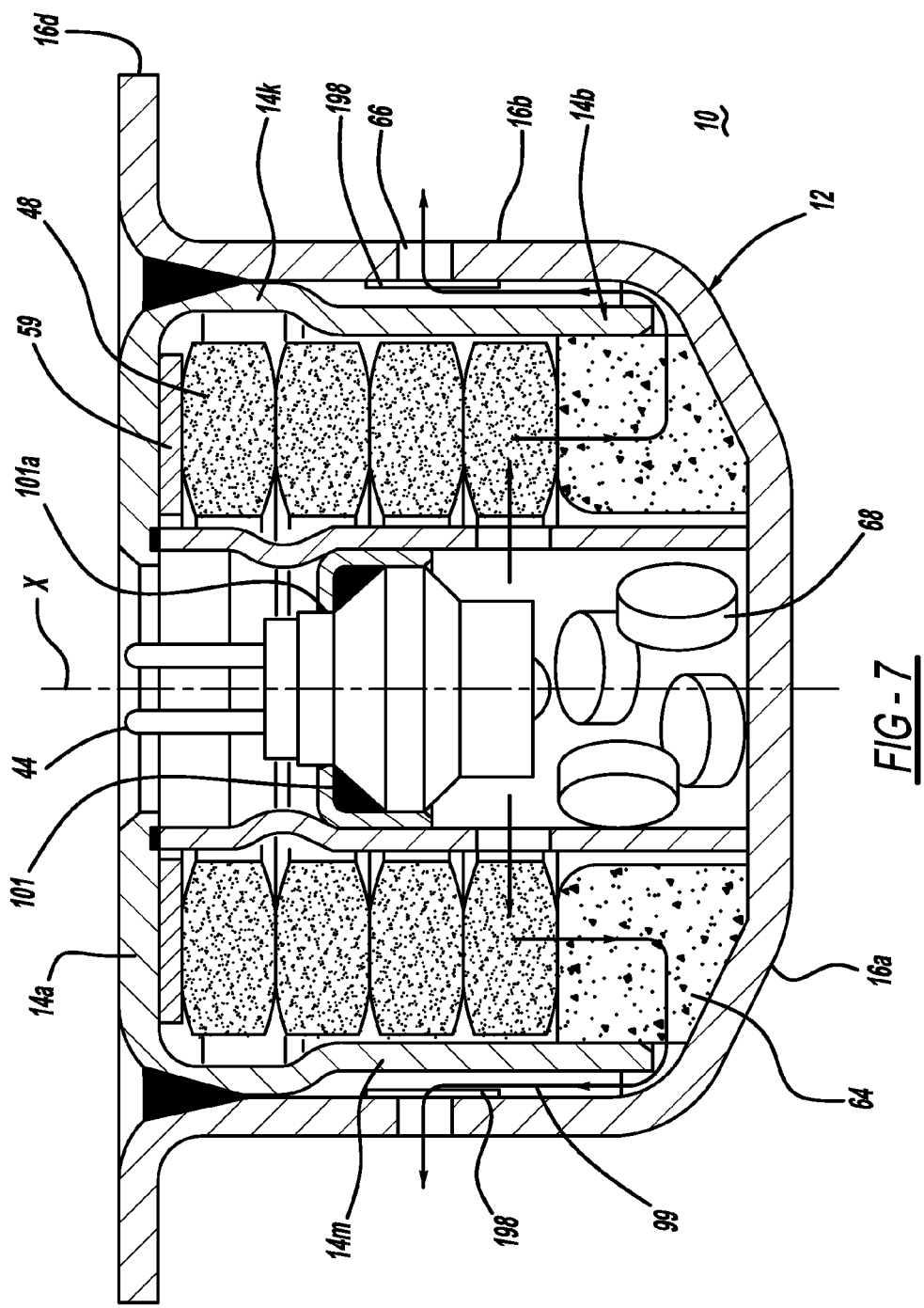
FIG. 7 is the cross-sectional side view of FIG. 6 showing operation of the embodiment of the gas generating system after activation of the system.

An outer dimension of first wall portion 14k may also be dimensioned in relation to the interior dimension D of second housing portion wall 16b so as to facilitate nesting of the first housing portion 14 within the second housing portion and attachment of the first housing portion 14 to the second housing portion using welding or other suitable means, so as to form a substantially gas-tight seal between the first and second housing portions. Also, as seen in FIG. 7, in the region where the gas tight seal is formed, the flow channel 99 ends and is blocked.

The gas-tight seal may be affected by, for example, dimensioning distended wall portion 14k and dimension D so as to engage the second housing portion wall 16b in a sliding fit or a suitable interference fit. If desired, an adhesive material (not shown) may be applied along the seam between wall portion 14k and wall 16b to aid in ensuring gas-tightness of the seal between the housing portions.

In another embodiment, wall portion 14k and wall 16b are dimensioned such that a clearance fit is formed between the wall portion 14k and wall 16b. Then, the seam between the first and second housing portions at wall portion 14k and wall 16b is sealed using a weld or by application of an adhesive material, for example.

Housing first portion 14 may be formed using known methods from a metal, metal alloy, or any other suitable material or materials.

In the embodiment shown in FIGS. 1-7, housing second portion 16 also has a base portion 16a and a wall 16b extending from a perimeter of the base portion to define a chamber 16c therein. A flange 16d projects generally outwardly from an edge of wall 16b to facilitate mounting or attachment of the assembled gas generating system to a portion of a vehicle or other apparatus. Wall 16b has at least one gas exit orifice 66 formed therein to enable fluid communication between an interior of the second housing portion 16 and an exterior of the second housing portion. In a particular embodiment, a plurality of gas exit orifices is formed in wall 16b. Housing second portion 16 may be formed using known methods from a metal, metal alloy, or any other suitable material or materials.

A booster tube 94 defining an interior cavity 94a is crimped, welded or otherwise suitably secured to housing first portion 14 within chamber 14c. Booster tube 94 contains a quantity of a known or suitable ignition or booster compound 68 used for facilitating combustion of gas generant material 48. Booster tube 94 is positioned and secured within housing portion 14 such that an interior of the booster tube is coaxial with or otherwise aligned with opening 24. In this configuration, opening 24 provides access to the interior of booster tube 94. At least one aperture 46 extends through a wall of booster tube 94 to enable fluid communication between the booster tube interior and a gas generant material 48 (see FIG. 4) positioned within chamber 14c exterior of the booster tube. Booster tube 94 may be formed from a metal, metal alloy, or any other suitable material or materials.

An initiator mount 101 is positioned and secured within the booster tube interior to enable mounting of an initiator 44 therein. In the embodiment shown in FIGS. 2-6, mount 101 has a base portion 101b and a wall 101c extending from a perimeter of the base portion. Mount 101 also has an opening 101a formed therein to enable access from an exterior of the booster tube to electrical contacts or terminals extending from initiator 44. This enables connection of the terminals to a suitable gas generating system activation signal transmission medium. Initiator mount 101 may be formed using known methods from a metal, metal alloy, or any other suitable material or materials. In alternative embodiments, features facilitating positioning and securement of the initiator within booster tube 94 may be formed in or on the tube itself. In the particular embodiment shown in FIGS. 1-7, a crimp or indentation 94b is formed in a wall of the tube 94 between a first end 94d and a second end 94e of tube 94. Mount 101 is inserted into tube 94 and abuts indentation 94b to position the mount 101 and an associated initiator 44 within tube 94. The position of the indentation (or indentations) may be specified so as to position the initiator 44 at a desired location along the interior of tube 94.

Initiator 44 is crimped, adhesively attached, or otherwise suitably attached to initiator mount 101 so as to form a substantially gas-tight seal between the igniter and the mount 101, thereby preventing escape of generated gases through mount opening 101a. In one embodiment, initiator 44 is a conventional pyrotechnic igniter. However, the initiator 44 may have any structure and may utilize any mode of operation suitable for a particular application.

Mount 101 may be secured within tube 94 using welding, adhesive attachment, or any suitable method.

When the gas generating system is assembled, booster tube 94, initiator mount 101, initiator 44, and second housing portion 16 combine to define a combustion chamber for a booster material 68 positioned within tube 94.

In a particular embodiment, a rupturable seal (not shown) is secured over each of booster apertures 46 to enable the booster tube to accommodate a resident interim gas pressure, thereby facilitating subsequent ignition of gas generant material 48 in a manner known in the art. Various known disks, foils, films, tapes, or other suitable materials may be used to form these seals.

A rupturable seal 198 may be secured over each of housing second portion orifices 66 to prevent entry of water vapor or other contaminants from entering the housing 12 prior to activation of the gas generating system. In a particular embodiment, seal 198 is formed by a single, continuous seal member secured along an interior surface of wall 16b to cover all of orifices 66. Various known disks, foils, films, tapes, or other suitable materials may be used to form the seals 198.

In the embodiment shown in FIGS. 1-7, a quantity of a known or suitable ignition or booster compound 68, whose combustion ignites gas generant material 48, is positioned within booster tube 94. In one embodiment, booster compound 68 is a known booster material positioned in booster tube 94 so as to enable fluid communication with igniter 44 after activation of the gas generating system.

Alternatively, the booster material 68 may be an auto-igniting booster material positioned so as to enable thermal communication with housing second portion 16, thereby enabling heat transfer from an exterior of the housing to the auto-igniting booster material using the housing as a heat transfer medium.

Alternatively, the booster material 68 may be positioned in housing 12 so as to enable thermal communication with an exterior of the housing via a thermal conduit or thermal transfer medium (not shown) other than the housing.

The auto-igniting booster material ignites responsive to heat transmitted thereto from an exterior of the housing, and facilitates ignition of the gas generant material positioned in the housing, in a manner known in the art.

An auto ignition material (not shown) may be placed in booster tube 94 in proximity to the booster material 68 and so as to be in direct contact with the housing 12, thereby enabling heat transfer from an exterior of the housing to the auto ignition material using the housing as a heat transfer medium.

Alternatively, the auto ignition material may be positioned in housing 12 so as to enable thermal communication with an exterior of the housing via a thermal conduit or thermal transfer medium (not shown) other than the housing. The auto-ignition material ignites responsive to heat transmitted thereto from an exterior of the housing, and facilitates ignition of the booster and/or gas generant material positioned in the housing, in a manner known in the art.

In a particular embodiment, the auto ignition material is positioned between a portion of booster tube configured to abut housing second portion 16, and a separator (not shown) which separates the booster material 68 from the auto ignition material, and which spaces the booster material 68 from the housing second portion 16 to define a cavity therebetween. The separator may include through holes formed therein or spaces formed between the separator and booster tube 94 to enable fluid communication between the cavity and the booster tube interior where booster material 68 is positioned, after activation of the gas generating system. This enables by-products resulting from combustion of the auto ignition material to ignite the booster material 68 in a manner known in the art. The separator may be formed from a metal, metal alloy, or any other suitable material or materials.

In one embodiment, the primary gas generant material 48 comprises a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding within a range of about 60% to about 80% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer. Other types of gas generant materials may also be used, according to the requirements of a particular application.

Referring to FIGS. 1-7, a resilient member 59 may be positioned within chamber 14c so as to lie between gas generant 48 and housing first portion 14. Resilient member 59 abuts gas generant 48 to aid in holding the gas generant material in place and in cushioning the gas generant against vibration and impact. Resilient member 59 may be formed from a metallic material, ceramic fiber material, or from any other material suitable for the purposes described herein.

An annular filter 64 is radially spaced from an axis X extending through chamber 14c. The filter 64 can be formed from any suitable material or materials, for example, multiple layers or wraps of metal screen or mesh. Although not limited thereby, U.S. Pat. Nos. 6,032,979 and 5,727,813, herein incorporated by reference, illustrate typical metal filters. In the embodiment shown in FIGS. 1-7, filter 64 is positioned atop or in contact with the gas generant stack.

In operation, the gases resulting from combustion of gas generant 48 are used to actuate a gas-actuatable device (not shown) operatively coupled to the gas generating system. In one embodiment, a sensor or other element (not shown) of a vehicle occupant protection system generates a signal indicating sudden deceleration or a crash event. This signal is then transmitted to initiator 44, thereby triggering ignition of the booster material 68. Upon ignition of booster material 68, the heat, flame, and combustion gases produced flow out of booster tube 94 and impinge on gas generant 48, thereby igniting the gas generant 48. The resultant gases then flow from chamber 14c through filter 64, through a passage defined by the second housing portion 16 and an edge of wall 14b of the first housing portion and out apertures 66 into an airbag or other gas-actuatable device (not shown).

Figure 8:
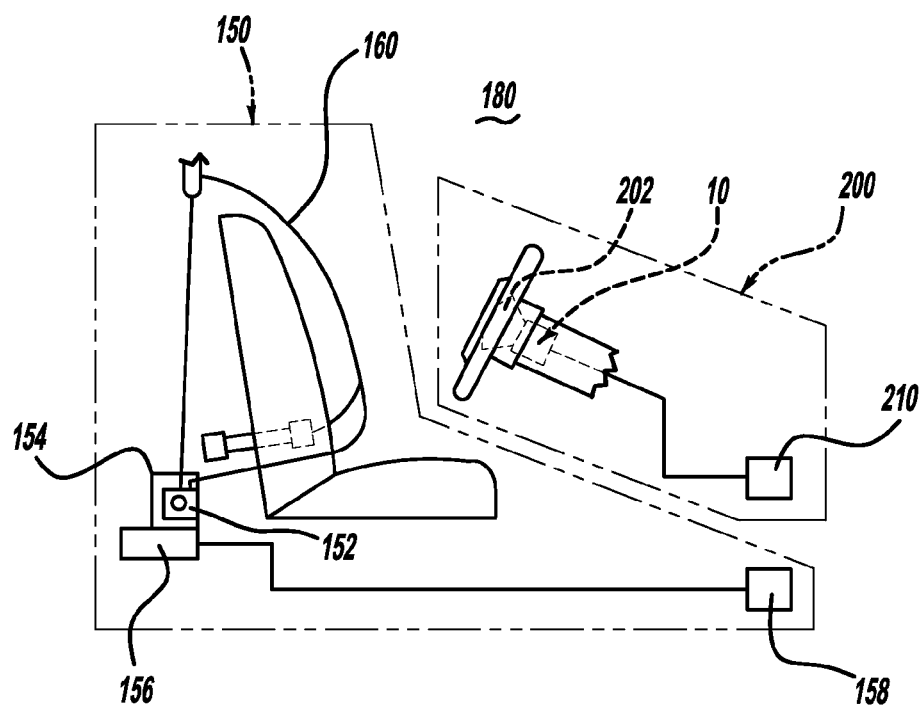
FIG. 8 is a schematic representation of an exemplary vehicle occupant protection system incorporating a gas generating system including a gas generating system in accordance with an embodiment of the present invention.

Referring now to FIG. 8, a gas generating system 10 in accordance with an embodiment described herein may be incorporated into an airbag system 200, Airbag system 200 includes at least one airbag 202 and a gas generating system 10 in accordance with an embodiment described herein. The gas generating system 10 is coupled to airbag 202 so as to enable fluid communication with an interior of the airbag upon activation of the gas generating system. Airbag system 200 may also include (or be in communication with) a crash event sensor 210 including a known crash sensor algorithm that signals actuation of airbag system 200.

Referring again to FIG. 8, a gas generating system in accordance with an embodiment of the present invention or an airbag system including an embodiment of the gas generating system may be incorporated into a broader, more comprehensive vehicle occupant protection system 180 including additional elements such as a safety belt assembly 150, as seen in FIG. 8. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558, 832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A gas generating system comprising:
   a housing including a first housing portion having a base portion and a wall extending from a perimeter of the base portion,
   the housing also including a second housing portion having a base portion and a wall extending from a perimeter of the base portion, the first housing portion wall and the second housing portion wall being structured to define a flow channel therebetween,
   the first housing portion wall including a first wall portion proximate the base portion, a second wall portion connected to the first wall portion, and a connecting portion sloping in a direction away from the second housing portion wall from the first wall portion to the second wall portion to connect the first wall portion to the second wall portion.

2. The gas generating system of claim 1 further comprising at least one orifice formed in the second housing portion to enable fluid communication between the flow channel and an exterior of the second housing portion.

3. The gas generating system of claim 2 wherein the first housing portion defines an interior and wherein the housing is configured to define a fluid flow path from the first housing portion interior through a passage defined by the second housing portion and an edge of a wall of the first housing portion, then into the flow channel, and from the flow channel through the at least one orifice to the exterior of the second housing portion.

4. A vehicle occupant protection system comprising a gas generating system in accordance with claim 1.

* * * * *